United States Patent
Nedic et al.

(10) Patent No.: US 7,436,881 B2
(45) Date of Patent: Oct. 14, 2008

(54) PER-BIN DFE FOR ADVANCED OQAM-BASED MULTI-CARRIER WIRELESS DATA TRANSMISSION SYSTEMS

(75) Inventors: Slobodan Nedic, Plainsboro, NJ (US); Nenad Popovic, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 1178 days.

(21) Appl. No.: 10/076,843

(22) Filed: Feb. 19, 2002

(65) Prior Publication Data
US 2003/0063680 A1    Apr. 3, 2003

Related U.S. Application Data

(60) Provisional application No. 60/325,227, filed on Sep. 28, 2001.

(51) Int. Cl.
H03H 7/40 (2006.01)
H03D 1/06 (2006.01)
H03K 7/02 (2006.01)

(52) U.S. Cl. .................. 375/233; 375/348; 375/353

(58) Field of Classification Search ........... 375/229, 375/233, 232, 350, 346, 236, 230, 316, 348, 375/284, 285, 259, 353, 223; 708/300, 322, 708/323; 370/485, 486, 487, 493, 494, 495
See application file for complete search history.

(56) References Cited

U.S. PATENT DOCUMENTS

| | | | |
|---|---|---|---|
| 4,621,355 A | | 11/1986 | Hirosaki et al. |
| 5,694,424 A | * | 12/1997 | Ariyavisitakul ............. 375/233 |
| 5,838,268 A | * | 11/1998 | Frenkel ...................... 341/111 |
| 5,870,433 A | * | 2/1999 | Huber et al. ................. 375/233 |
| 5,982,784 A | * | 11/1999 | Bell ........................... 370/485 |
| 6,002,713 A | * | 12/1999 | Goldstein et al. ........... 375/222 |
| 6,005,894 A | * | 12/1999 | Kumar ........................ 375/270 |
| 6,115,418 A | * | 9/2000 | Raghavan ................... 375/233 |
| 6,158,041 A | * | 12/2000 | Raleigh et al. .............. 714/792 |
| 6,327,311 B1 | * | 12/2001 | Ojard ......................... 375/261 |

(Continued)

OTHER PUBLICATIONS

Hanli Zou, "Equalized GMSK, Equalized QPSK and OFDM, a Comparative Study for High-Speed Wireless Indor Data Communication," May 20, 1999, IEEE 49th vol. 2.*

(Continued)

*Primary Examiner*—Mohammad Ghayour
*Assistant Examiner*—Vineeta S Panwalkar
(74) *Attorney, Agent, or Firm*—Sughrue Mion, PLLC

(57) ABSTRACT

An Apparatus for non-linear per-bin adaptive equalization in orthogonal multi-carrier data transmission systems with the Nyquist sub-channel spectral shaping and T/2 staggering of in-phase and quadrature components is disclosed. A previously introduced linear equalization embodiments are augmented by up to three, or more decision feed-back filters, to improve performance in presence of narrow-band interference (NBI) in wire-line and wire-less data transmission systems, and to enable exploitation of implicit diversity of multi-path fading channels, both with and without transmitter-end pre-coding. Adaptation properties of per-bin DFE equalization are analyzed by computer simulation for an intermediate number of constituent sub-channels. BER performance comparison between the conventional Orthogonal Frequency Division Multiplication-(OFDM) and (Orthogonal Quadrature Amplitude Modulation (OQAM)-based multi-carrier systems of similar modulation/demodulation complexity and transmission latency is provided and the potential advantage of using spectrally well shaped orthogonal sub-channels in wireless applications is demonstrated.

11 Claims, 7 Drawing Sheets

U.S. PATENT DOCUMENTS

| | | | |
|---|---|---|---|
| 6,381,267 B1* | 4/2002 | Abdelilah et al. | 375/222 |
| 6,411,657 B1* | 6/2002 | Verbin et al. | 375/285 |
| 6,493,395 B1* | 12/2002 | Isaksson et al. | 375/261 |
| 6,526,093 B1* | 2/2003 | Bao et al. | 375/233 |
| 6,535,552 B1* | 3/2003 | Pessoa | 375/231 |
| 6,563,841 B1 | 5/2003 | Nedic et al. | |
| 6,570,917 B1* | 5/2003 | Lai et al. | 375/232 |
| 6,597,746 B1* | 7/2003 | Amrany et al. | 375/296 |
| 6,600,780 B1* | 7/2003 | Wang et al. | 375/233 |
| 6,608,864 B1* | 8/2003 | Strait | 375/233 |
| 6,671,338 B1* | 12/2003 | Gamal et al. | 375/346 |
| 6,674,808 B1* | 1/2004 | Griph et al. | 375/285 |
| 6,741,551 B1* | 5/2004 | Cherubini | 370/210 |
| 6,782,046 B1* | 8/2004 | Ling et al. | 375/232 |
| 6,823,028 B1* | 11/2004 | Phanse | 375/345 |
| 6,876,696 B1* | 4/2005 | Goodson et al. | 375/219 |
| 6,879,639 B1* | 4/2005 | Verbin et al. | 375/285 |
| 6,891,887 B1* | 5/2005 | Dobson | 375/220 |
| 6,985,432 B1* | 1/2006 | Hadad | 370/203 |
| 2001/0036237 A1* | 11/2001 | Storm et al. | 375/350 |
| 2002/0196844 A1* | 12/2002 | Rafie et al. | 375/232 |
| 2003/0016770 A1* | 1/2003 | Trans et al. | 375/346 |
| 2003/0081668 A1* | 5/2003 | Yousef et al. | 375/232 |
| 2003/0081693 A1* | 5/2003 | Raghavan et al. | 375/298 |
| 2003/0107986 A1* | 6/2003 | Malkemes et al. | 370/208 |
| 2004/0062191 A1* | 4/2004 | Lacroix-Penther et al. | 370/206 |
| 2004/0252755 A1* | 12/2004 | Jaffe et al. | 375/233 |

OTHER PUBLICATIONS

Peter Monsen, entitled "Digital Transmission Performance on Fading Dispersive Diversity Channels"; IEEE Transactions on Communications, vol. Com-21, No. 1, Jan. 1973, pp. 33-39.

Thomas Hunziker et al., entitled "Iterative Symbol Detection for Bandwidth Efficient Nonorthogonal Multicarrier Transmission", IEEE, Swiss Federal Institutive of Technology (ETH), Communication Technology Laboratory, VTC 2000, pp. 61-65, May 2000.

Robert F.H. Fischer et al., entitled "On the Equivalence of Single and Multicarrier Modulation: A New View", IEEE, ISIT 1997, Germany Jun. 29-Jul. 4, p. 197.

Weimin Yang et al., entitled "A Multirate Wireless Transmission System Using Wavelet Packet Modulation", IEEE, Dept. of Radio Engineering, Southeast University, Dept. of Information Engineering, Chinese University of Hong Kong, 1997, pp. 368-372.

Renyuan Li et al., entitled "Time-Limited Orthogonal Multicarrier Modulation Schemes", IEEE Transactions on Communications, vol. 43, No. 2/3/4, Feb./Mar./Apr. 1995, pp. 1269-1272.

Slobodan Nedic, entitled "An Unified Approach to Equalization and Echo Cancellation in OQAM-based Multi-Carrier Data Transmission", IEEE, Michael Pupin Institute, Telecommunications Lab., pp. 1519-1523, Nov. 1997.

Burton R. Saltzberg, entitled "Performance of an Efficient Parallel Data Transmission System", IEEE Transactions on Communication Technology Dec. 1967, pp. 805-811.

Davide Dardari et al., entitled "High-Speed Indoor Wireless COFDM Systems at 60 GHz: Performance and Design Criteria", IEEE, DEIS/CSITE, University of Bologna, 1997, pp. 1306-1311.

Bernard Le Floch et al., entitled "Digital Sound Broadcasting to Mobile Receivers", IEEE, Jun. 9, 1989, pp. 493-503.

S.B. Weinstein et al., entitled "Data Transmission by Frequency-Division Multiplexing Using the Discrete Fourier Transform", IEEE Transactions on Communication Technology, vol. COM-19, No. 5, Oct. 1971, pp. 628-634.

R.R. Mosier et al., entitled "Kineplex, A Bandwidth-Efficient Binary Transmission System", Jan. 1958, pp. 723-728.

Lorenzo Vangelista et al., IEEE Transactions on Communications, vol. 49, No. 4, Apr. 2001, pp. 664-675.

Anders Vahlin et al., entitled "Optimal Finite Duration Pulses for OFDM", IEEE Transactions on Communications, vol. 44, No. 1, Jan. 1996, pp. 10-14.

Juuso Alhava et al., entitled "Adaptive Sine-Modulated/Cosine-Modulated Filter Bank Equalizer for Transmultiplexers", ECCTD'01, European Conference on Circuit Theory and Design, Aug. 28-31, 2001, Espoo, Finland, pp. 337-340.

Slimane Ben Slimane, entitled "OFDM Schemes with Non-Overlapping Time Waveforms", IEEE, Radio Communication Systems, pp. 2067-2071, May 1998.

Phillip A. Bello et al., entitled "Adaptive Equalization for SQPSK and SQPR Over Frequency Selective Microwave LOS Channels", IEEE Transactions on Communications, vol. COM-32, No. 5, May 1984, pp. 609-615.

Robert Vallet, entitled "Fraction Spaced Multi-Carrier Modulation", Wireless Personal Communications, 1995, pp. 97-103.

Botaro Hirosaki, entitled "Generalized Differential Coding Theorem and Its Applications", Electronics and Communications in Japan, vol. 67-B, No. 2, 1984, pp. 46-53.

Botaro Hirosaki, entitled "An Analysis of Automatic Equalizers for Orthogonally Multiplexed QAM Systems", IEEE Transactions on Communications, vol. COM-28, No. 1, Jan. 1980, pp. 73-83.

Robert W. Chang, entitled "Synthesis of Band-Limited Orthogonal Signals for Multichannel Data Transmission", Aug. 4, 1966, pp. 1775-1795.

* cited by examiner

PER-BIN DFE FOR ADVANCED OQAM-BASED MULTI-CARRIER WIRELESS DATA TRANSMISSION SYSTEMS

This application is an application filed under 35 U.S.C. §111(a), claiming benefit pursuant to 35 U.S.C. §§119-120 of the filing date of the Provisional Application Ser. No. 60/325,227 filed on Sep. 28, 2001, pursuant to 35 U.S.C. §111(b). The Provisional Application Ser. No. 60/325,227 is incorporated herein by reference for all it discloses.

BACKGROUND OF THE INVENTION

1. Field of the Invention

The present invention relates to an apparatus for providing equalization in orthogonal multi-carrier data transmission systems, and more particularly relates to an apparatus for providing per-bin decision feedback equalization (DFE) for advanced OQAM-based multi-carrier wireless data transmission systems, as an example of a class of multi-carrier systems with spectrally shaped and over-lapped sub-channels.

2. Description of Related Art

Multi-carrier (MC) data transmission systems were traditionally applied as an alternative to conventional single-carrier (SC) systems in situations where the latter would inevitably require adaptive equalization. Toward this end, in the early MC data transmission systems of the Kineplex type (see for example, R. R. Mosier and R. G. Clabauch, "Kineplex, a bandwidth-efficient binary transmission system," *Trans. AIEE (Comm. and electronics)*, pp. 723-728, January 1958), and its FFT-based implementation (see for example S. B. Weinstein and P. M. Ebert, "Data transmission by frequency multiplexing using the DFT," *IEEE Trans. Com. Techn.* Vol. COM-19, pp. 528-634, October, 1971), as well as in the newer applications of partially shaped rectangular sub-channel signaling elements in the broadcasting (see for example, B. LeFloch R. Halbert-Lassalle and D. Castelain, "Digital sound broadcasting to mobile receivers," *IEEE Trans. Cons. Electr.*, Vol. 35, No. 3, pp. 493-503, August 1989), wireless LAN (see for example, D. Dardari and V. Tralli, "Performance and design criteria for high-speed indoor services," *Proc. IEEE Globecom'97*, Phoenix, Ariz., pp. 1306-1311, November 1997), and the currently considered 4G cellular system proposals, a time-guard interval, so called cyclic prefix (CP), is used, with the length chosen to be longer than the expected length of channel impulse response.

Since the utilization of CP reduces spectral efficiency, the use of relatively high number of sub-channels is preferred. This in turn leads to an increased peak-to-average power ratio and a wide range of associated problems regarding power-efficient amplification. These problems include: requiring a relatively large dynamic range for analog-to-digital (ADC) conversion; an increased system delay and memory requirements; and a more pronounced impact of multiplicative distortions (carrier offset, phase jitter and time-selective fading) in wireless applications. The sole reliance on the guard-time interval in OFDM wireless applications proves insufficient in case of multi-path delay spreads exceeding the length of CP, and, much more importantly, the constrained sub-channel bandwidths preclude any utilization of implicit multi-path diversity. Contrary to the often claimed feature of C(coded) OFDM (see for example, B. LeFloch R. Halbert-Lassalle and D. Castelain, "Digital sound broadcasting to mobile receivers," IEEE Trans. Cons. Electr., Vol. 35, No. 3, pp. 493-503, August 1989), to exploit the implicit frequency of multi-path channels, the underlying utilization of coding with interleaving merely counteracts the appearance of bursty errors at the expense of a large data transmission overhead.

On the other hand, the orthoganally frequency-division multiplexed (OFDM) multi-carrier data transmission system with Nyquist-type shaped sub-channel spectra and the staggered (S-), or offset (O-) quadrature amplitude modulation (QAM) in its sub-channels, proposed in B. R. Salzberg, "Performance of efficient parallel data transmission system," *IEEE Trans. Comm. Technology*, Vol. COM-15, pp. 805-811, December 1967, based on the previously established orthogonality conditions (see for example R. W. Chang, "Synthesis of band-limited orthogonal signals for multi-carrier data transmission," *The Bell Syst. Techn. Journal*, Vol. 45, pp. 1775-1796, December 1996), is maximally efficient spectrally. It was first shown in B. Hirosaki, "An analysis of automatic equalizer for orthogonally multiplexed QAM systems," *IEEE Trans. on Comm.*, Vol. 28, No. 1, pp. 73-83, January 1980, that the adaptive equalization in OQAM-based MC system can be carried out by using per-subchannel equalizers. This "dual" equalization cancels both the inter- and intra sub-channel interference (ISI and ICI), and basically does not impose any constraint regarding preferable number of sub-channels, leaving such a choice to be based on other system implementation and transmission impairment related issues. However, because the equalization method of Hirosaki involves the re-alignment of QAM in-phase and quadrature components and consequently exhibits a strong interaction between linear distortion and carrier/sampling phase offset compensation, it is difficult to implement (see for example, B. Hirosaki, "Generalized differential coding theorem and its application," *Electronics and Communications in Japan*, Vol. 67-B, No. 12, pp. 46-53, 1984).

An alternative equalization method, partly introduced in S. Nedic, "An unified approach to equalization and echo-cancellation in multi-carrier OQAM-based data transmission," *Globecom'97*, Phoenix, Ariz., 1997, relies on the notion of the inherent half QAM symbol signaling intervals and as result, is more general, easier to implement, and readily extendable to other orthogonal multi-carrier data transmission systems, such as time-limited orthogonal (TLO)(see for example, R. Li and G. Stette, "Time-limited orthogonal multi-carrier modulation schemes," *IEEE Trans. on Comm.*, Vol. 43, No. 2/3/4, pp. 1269-1272, February/March/April, 1995 and J. Alhava, M. Renfors, "Adaptive sine-modulated/cosine-modulated filter bank equalizer for transmultiplexers," *ECCTD'01*, August 28-31, Espoo, Finland, 2001), discrete wavelet multi-tone (DWMT)(see for example, W. Yang, and T-Sh. P. Yum, "A multirate wireless system using wavelet packet modulation," *VTC'97*). The commonalities between seemingly different OQAM-MC and DWMT signaling formats, and thus the general applicability of per-bin linear and DFE equalization methods, can be established by simple frequency shift in respective defining equations, as discussed below.

Starting from its defining relation, the OQAM-MC transmit signal can be expressed in concise form by the following expression, pertaining to the conventional modulation conception:

$$s(t) = \text{Re}\left\{\sum_{k=0}^{N-1}\left[\sum_{m=-\infty}^{+\infty} \alpha_{k,m} \cdot g\left(t - m\frac{T}{2}\right)\right] \cdot \exp[j(2\pi \cdot f_k t)]\right\}, \text{ with} \quad (A)$$

$$\alpha_{k,m} = a_{k,m} \cdot \exp\{j[(-1)^k + (-1)^m][(-1)^{(k-1)(m-1)}](\Pi/4)\} \quad (B)$$

Above, the parameter T is the QAM symbol interval duration and $f_k$ is the k-th sub-channel central frequency, nominally defined by k/T. Variables $a_{k,m}$ in equation (B), for two consecutive even and odd values of m, represent the real and imaginary parts of complex QAM data symbols in the k-th sub-channel. It can be easily seen that (B) corresponds to following, commonly used definition:

$$\alpha_{k,m} = \begin{cases} a_{k,m}, & \text{for even } m \text{ and odd } k; \\ -ja_{k,m}, & \text{for odd } m \text{ and odd } k; \\ -ja_{k,m}, & \text{for even } m \text{ and even } k; \\ a_{k,m}, & \text{for odd } m \text{ and even } k. \end{cases}$$

On the other side, the DWMT transmit signal is commonly described in its pass-band signaling form as $$s(t) = R_e \left\{ \sum_{k=0}^{N-1} \sum_{m=-\infty}^{+\infty} \alpha_{k,m} \cdot g\left(t - m\frac{T}{2}\right) \exp\left[j2\pi \cdot f_k'\left(t - m\frac{T}{2}\right) + \theta_k\right] \right\},$$

with $\theta_k = (-1)^k (\pi/4)$ and $f_k' = (2k+1)(\frac{1}{2}T)$.

Transformed to the form of a sum of conventionally modulated base-band data signals, the DWMT signal takes the form $$s(t) = R_e \left\{ \sum_{k=0}^{N-1} \left[ \sum_{m=-\infty}^{+\infty} \alpha'_{k,m} \cdot g\left(t - m\frac{T}{2}\right) \right] \cdot \exp[j(2\pi \cdot f_k' t)] \right\}, \text{ where}$$

$\alpha'_{k,m} = a_{k,m} \cdot \exp\{j[(-1)^k (\pi/4) - (\pi/2)m(2k+1)]\}$.

After shifting the above signal in frequency for $-\frac{1}{2}T$, by multiplying bracketed term with $\exp[-j(2\Pi/2T + \Pi/4)]$, it takes the form $$s(t) = R_e \left\{ \sum_{k=0}^{N-1} \sum_{m=-\infty}^{+\infty} \tilde{\alpha}'_{k,m} \cdot g\left(t - m\frac{T}{2}\right) \cdot \exp[j(2\pi \cdot f_k t)] \right\}, \text{ with}$$

$\alpha'_{k,m} = a_{k,m} \cdot \exp\{j[(1+(-1)^k)(\pi/4) - (\pi/2)m(2k+1)]\}$.

can be easily verified that the data symbols above can be represented in following way, as $$\tilde{\alpha}'_{k,m} = \begin{cases} a_{k,m} \cdot Y, & \text{for even } m \text{ and odd } k; \\ -ja_{k,m} \cdot Y, & \text{for odd } m \text{ and odd } k; \\ -ja_{k,m} \cdot Y, & \text{for even } m \text{ and even } k; \\ a_{k,m} \cdot Y, & \text{for odd } m \text{ and even } k, \end{cases}$$

where $\gamma$ alternates between +1 to −1 for every second pair of signaling intervals T/2.

Since changing sign of data symbols bears no relevance to system orthogonality, by comparing with originating expressions, (equation 1 in the main part of application), basic commonality among the OQAM-MC and DWMT signaling formats can be established. That means that whatever impulse response g(t), or window w(t), may satisfy the orthogonality criteria for one system, it will apply to the other system, and vice versa. This fully applies to the TLO-MC signaling format as well.

The per-bin equalization for multi-carrier signals with overlapped and well confined sub-channel spectra resembles the application of conventional equalization to single-carrier (SC) systems or to sub-channels in filtered multi-tone (FMT) format with non-overlapped sub-channel spectra (see for example, R. Vallet and K. H. Taieb, "Fraction spaced multi-carrier modulation," *Wireless Personal Communications* 2: 97-103, 1995, Kulwer Academic Publishers). However, the overlapping of sub-channel spectra influences both the spectral (transfer function) and convergence properties of intrinsically base-band type per-bin equalizers and involves decisions from adjacent bins in the non-linear, decision feed-back (DFE) variant of interest here. One should bear in mind that it is the application of sub-channels bandwidths exceeding the multi-path fading coherence band-width where application of DFE equalization can effectuate substantial multi-path diversity gain, in line with the early established results regarding implicit diversity feature (see for example, P. Monsen, "*Digital transmission performance on fading dispersive diversity channels,*" IEEE Trans. On Comm., Vol. COM-21, No. 1, pp. 33-39, January, 1972). Wider sub-channels are also favorable for better suppression of narrow-band interference (NBI) impairments.

BRIEF SUMMARY OF THE INVENTION

An object of this invention is to demonstrate the practical feasibility of DFE per-bin equalization in MC formats with overlapped and shaped sub-channel spectra, as an enabling methodology for introduction of more advanced wire-line/wireless systems and their utilization as a viable alternative to conventional DMT/OFDM systems and their flavors in terms of combination with Code Division Multiplexing Access (CDMA), with the applicability of all the flavors of DFE adaptation methods in training and decision-directed modes as used in conventional single-carrier QAM systems, including appropriately adopted Tomlinson-Harashima pre-coding. Also, an optional operation mode with interpolated data symbols in receiver and/or transmitter parts.

One embodiment of this invention is a multi-carrier data transmission system that includes: a transmitter; a transmission channel connected to the transmitter; and a receiver connected to said transmission channel. The receiver includes a feed-forward FIR filter and a feed-back FIR filter, wherein outputs of the feed-forward FIR filter and feed-back FIR filter are combined.

In another embodiment of this invention, the receiver further includes at least two pulse amplitude modulation slicers and real and imaginary extractors. The real and imaginary extractors receive data from the feed-forward FIR filter and output data to the pulse amplitude modulation slicers. In addition, data from the pulse amplitude modulation slicers is provided directly to the feed-back FIR filter, once every T/2 separated instants, as are the data from such slicing blocks belonging to subchannels adjacent to the equalized one.

In yet another embodiment of this invention, only one f-BF is used, that is fed by the output of interpolation block, the interpolation being fed by referent symbols of adjacent sub-channels during the coefficients adaptation procedure.

BRIEF DESCRIPTION OF THE DRAWINGS

The above and further objects, features and advantages of the invention will become clear from the following more detailed description when read with reference to the accompanying drawings in which.

DETAILED DESCRIPTION OF THE INVENTION

Starting from the defining relation in Salzberg, mentioned above, the OQAM-MC transmit signal can be expressed in concise form by equation (1), with:

$$s(t) = R_e\left\{\sum_{k=0}^{N-1}\left[\sum_{m=-\infty}^{+\infty}\alpha_{k,m}\cdot g\left(t-m\frac{T}{2}\right)\right]\cdot \exp[j(2\pi\cdot f_k t)]\right\}, \quad (1)$$

where:

$$\alpha_{k,m} = \begin{cases} a_{k,m}, & \text{for even } m \text{ and odd } k; \\ -ja_{k,m}, & \text{for odd } m \text{ and odd } k; \\ -ja_{k,m}, & \text{for even } m \text{ and even } k; \\ a_{k,m}, & \text{for odd } m \text{ and even } k. \end{cases}$$

In equation (1), the parameter T is the QAM symbol interval duration and $f_k$ is the $k^{th}$ sub-channel central frequency, nominally defined by k/T. Variables $a_{k,m}$ shown above, for two consecutive even and odd values of m, represent the real and imaginary parts of complex QAM data symbols in the $k^{th}$ sub-channel. g(t) represents the real impulse response of the square-root raised cosine low-pass transfer function, G(ω), with the roll-off factor $0 \leq \alpha \leq 1$. The transfer function G(ω) has 3 dB attenuation at frequencies $\pm\frac{1}{2}T$ and ideally is zero outside the interval $[-(1+\alpha)/2T, (1+\alpha)/2T]$.

Figure 1:
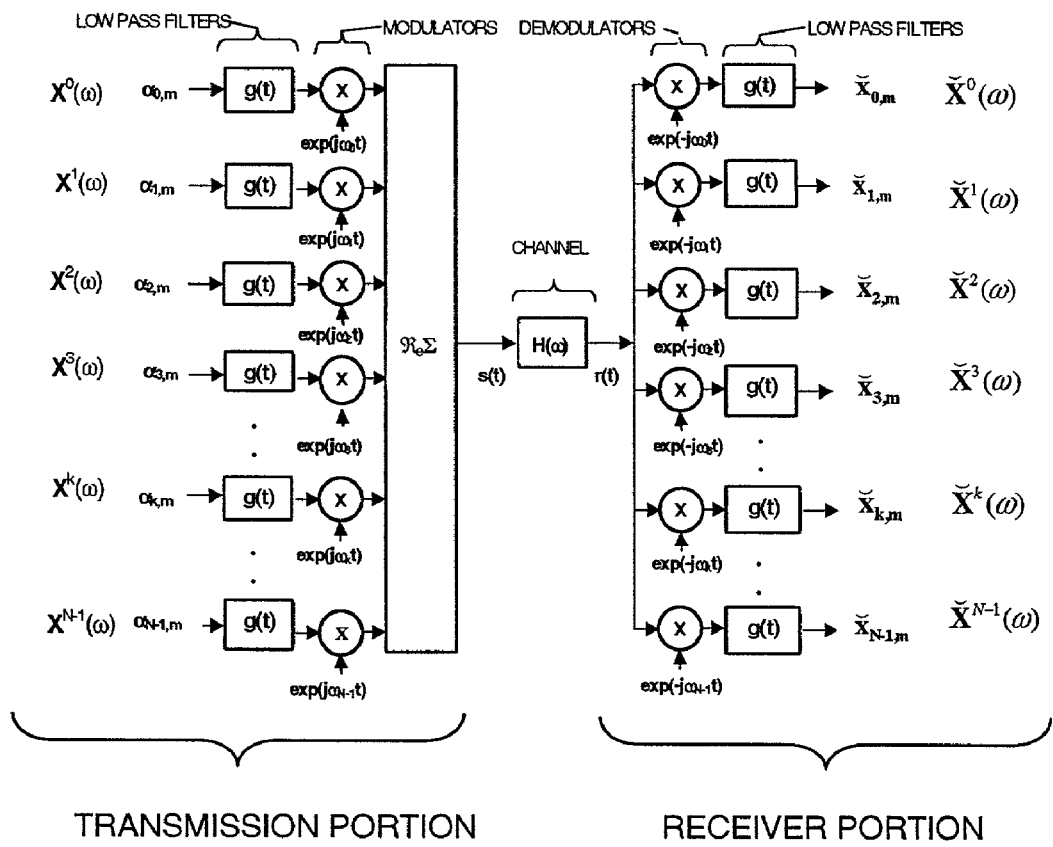
FIG. 1 is a block diagram of an embodiment of an OQAM-type multi-carrier system.

Combined with a demodulation part and the transmission channel with transfer function H(ω), a generic block diagram of an OQAM-MC transmission system is shown in FIG. 1. This diagram has been used to derive the linear per-bin equalization structure, and its DFE extension, being the main part of this invention. The left hand portion of FIG. 1 comprises the transmission portion of the system. Data, e.g., $X^o(\omega)$, etc., are input to a series low pass filters, which output signals to a series of modulators. The outputs of the modulators are summed and provided to the transmission channel.

The right hand portion of FIG. 1 comprises the receiver portion of the system. The signal output from the transmission signal is input to a series of demodulators, which output signals to a series of low pass filters. Data, e.g., $X^o$ is then output from the low pass filters.

Figure 2A:
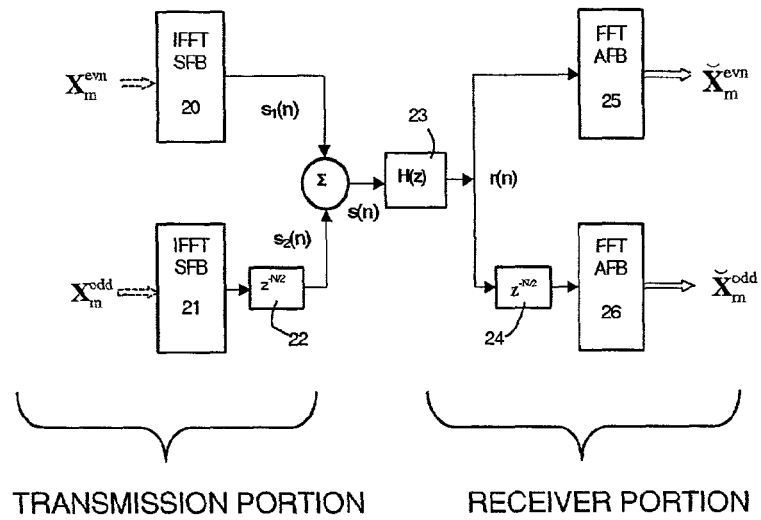
FIGS. 2A and 2B show the digital implementation principle block diagrams of OQAM type orthogonal MC systems, including detailed illustration of synthesis and analysis filter banks, SFB and AFB for transmitter and receiver parts, respectively.

Next, the transceiver generic computationally efficient digital implementation will be described, in order to concisely describe the OQAM-MC DFE per-bin equalization configuration. The FIG. 2A shows a basic computationally efficient realization of the multi-carrier system of FIG. 1 comprising a transmission portion and receiver portion as is well known to those skilled in the art. The 2:1 over-sampled filter-bank configuration is used based on combination of inverse fast Fourier transform IFFT and poly-phase filtering (see for example, N. J. Fliege, *Multirate DSP*, John Wiley & Sons, 1994). The transmission portion comprises IFFT synthesis filter banks (SFB) 20, 21 and a delay element 22. The output from the transmission portion is provided to the transmission channel 23. The receiver portion comprises a delay element 24 and analysis filter banks (AFB) 25 and 26.

The principle block diagram offers a unified representation of the OQAM type MC systems, although more computationally efficient realizations are known (see for example, L. Evangelista, N. Laurenti, "*Efficient implementation and alternative architectures for OFDM-OQAM systems,*" IEEE Tr. on Comm., Vol. 49, No. 4, pp. 664-675, April 2001). The operator $z^{-1}$ denotes the exp(–jωT/N)) transfer function, that is a delay of one sampling interval T/N.

Figure 2B:
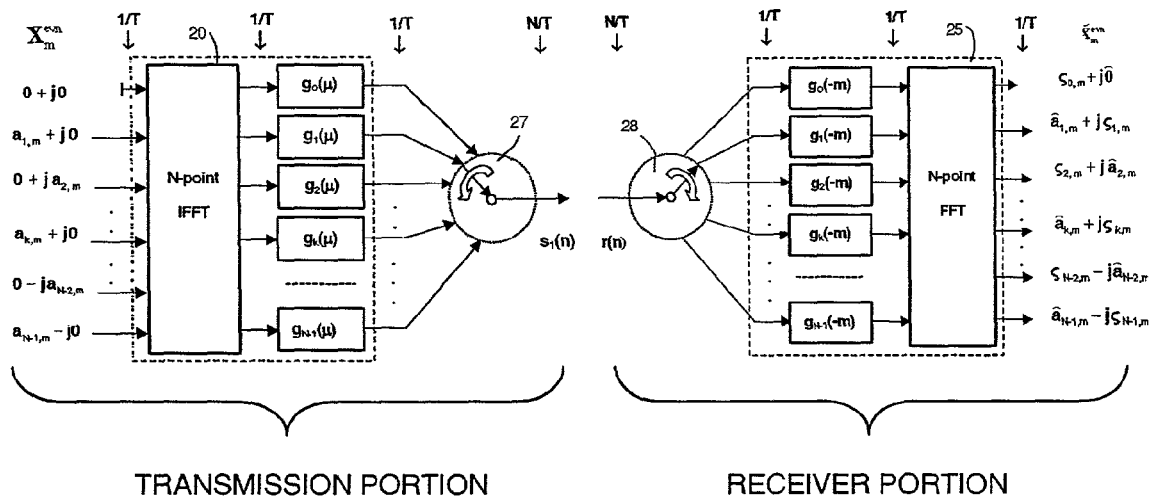

In FIG. 2B, the impulse responses $g_p(m)$ and $g_p(-m)$ are N poly-phase decompositions of g(n) and g(-n) with decimation factor N:1. Effectively, there are two critically sampled analysis and synthesis filter banks (AFB and SFB) stacked in time by T/2 intervals. In the transmission portion, the AFB 20 comprises an N-point IFFT and a series of low pass filters (e.g., $g_o(\mu)$, etc.). The output of the AFB 20 is provided to a commutator 27 which provides the data to the transmission channel (not shown). The vectors $X_m^{evn}$ and $X_m^{odd}$ of FIG. 2A, have N quasi-complex elements composed of $a_{k,m}$ data symbols for even and odd indices m, respectively, so that their elements are purely real or purely imaginary numbers.

In the receiver portion, data from the transmission channel is provided to the commutator 28, which supplies data to the AFB 25. The AFB 25 comprises an N-point FFT and a series of low pass filters (e.g., $g_o(-m)$, etc.). At the receiver end, for an ideal transmission channel, the transmitted real data symbols are fully recovered, while the real and imaginary parts, which are equivalent to zero at the transmitter side, become non-zero, as a result of inter-bin (ICI) and inter-symbol (ISI) interference. When the channel introduces linear distortions, linear per-bin equalization, as outlined bellow, can be used to substantially restore the intrinsic orthoganality of the MC system, and to essentially recover the information bearing transmitted data symbols.

Next, per-bin equalization as an alternative and improved embodiment of the previously known one, and its DFE extension will be described based on the generic block diagram of the MC system shown in FIG. 1. The Fourier transform of the signal at the $k^{th}$ sub-channel output of the system depicted in the FIG. 1 becomes:

$$\breve{X}_k(\omega) = \left\{\sum_{l=-1}^{1} X^{k+l}\left(e^{j(\omega+\omega_k-\omega_{k+l})\frac{T}{2}}\right)\cdot Q_{k+l,k}(\omega)\right\}H(\omega+\omega_k), \quad (2)$$

where $X^k(\omega)$—is the Fourier transform of $k^{th}$ sub-channel data signal, and Q functions are defined in equation (3) as:

$$Q_{k+l,k}(\omega) = \frac{1}{2} \cdot G(\omega) \cdot G\left(\omega - l \cdot \frac{2\pi}{T}\right); l = -1, 0, 1. \quad (3)$$

Figure 3A:
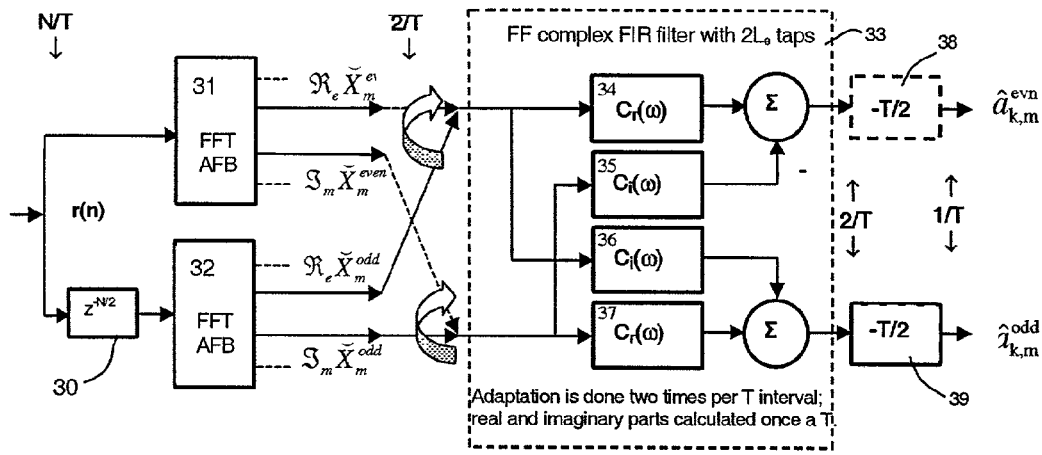
FIGS. 3A and 3B are illustrations of per-bin equalization for k-th sub-channel; a linear equalizer is shown in FIG. 3A and the non-linear DFE embodiment is shown in FIG. 3B.

The bracketed term in equation (2) represents the $k^{th}$ bin output for the case of an ideal channel and it is spectrally limited to the bandwidth $[-(1+\alpha)/2T, (1+\alpha)/2T]$, while $H(\omega+\omega_k)$ is the equivalent low-pass transfer function of the channel with respect to central frequency of the $k^{th}$ bin. This means that by cascading to the $k^{th}$ sub-channel output a low-pass filter with a transfer function that is essentially an inverse of the equivalent channel transfer function for the respective sub-channel bandwidth, the $k^{th}$ sub-channel can be effectively equalized by restoring the intrinsic system orthoganally. Such an equalizer simultaneously accounts for both the inter- and intra-bins interference. Since the inversion of the transfer function is required within the frequency bandwidth lower than or equal to $[-1/T, 1/T]$, the complex finite impulse response (FIR) filter 33 with 2/T input/output sampling rate can be used as an equalizer. Thus, the two samples available per T interval at the output of receiver filter-bank can be used to have the $2L_e$ taps FIR filter per-bin equalizer with time span $L_e T$, shown in FIG. 3A, tend to synthesize an approximation of the equivalent channel inverse transfer function to the extent determined by compromise achievable in suppression of additive noise impairments using the conventional minimum mean square error (MMSE) criterion. The receiver shown in FIG. 3A comprises a delay element 30, FFT AFBs 31 and 32, FF complex FIR filter 33 and delay elements 38 and 39. The FF complex FIR filter 33 comprises real filters 34 and 37 and imaginary filters 35 and 36.

By restructuring equation (2) into a sum of products, and by interpreting the $H(\omega+\omega_k)$ term appearing along $X^{k+l}(\cdot)$ for l=1 and l=-1 by an equivalent argument augmentation to $H(\omega+\omega_k+\omega_{k+l}+\omega_{k-l})$ as (pre-)filtered (k+l)-th sub-channel input by the equivalent channel transfer function for that, (k+l)-th bin, two possible DFE structures emerge. The structures emerge by considering the equalizer transfer function as a cascade of feed-forward part, to mainly cope with the equivalent channel transfer function all-poles polynomial, and recursive (feed-back) part, responsible for compensation of all-zero polynomial part in the equivalent channel zero/pole type transfer function. One structure, shown in FIG. 3B, has three backward filters (F-BF) 41, 42 and 43 fed by the referent symbols, or symbol decisions from neighboring bins, through commutators 49, 50 and 51, fed by non-interpolated referent or the symbols currently decided upon for the respective bins. The other structure has only one F-BF for k-th bin, along with F-FF one, as in previous case, with referent symbols for the considered k-th bin interpolated in such a way to account for both inter-symbol and inter-bin interference. FIG. 4 illustrates the interpolation procedure performed by filtering, or by back to back SFB/AFB cascading. The empty circles represent zero values; the black circles represent data symbols; and the gray spots represent interpolated "data" symbols. This allows the feed-forward FIR filter (F-FF) 33 to abandon the attempted direct orthoganality restoration and to achieve a much better compromise between inversion of transfer function and the suppression of colored and possibly cyclo-stationary additive noise than in linear case, along with compensation of frequency selective fading mechanism of wireless channels. Data from the F-FF 33 is supplied from a commutator 48. The data from the commutator 48 is provided to extractors 46 and 47 which extract real and imaginary components respectively. The output of the extractors is supplied to pulse amplitude modulation (PAM) slicers 44 and 45, which output data to delay elements −T/2. In addition, the referent signals or decissions from from the outputs of the PAM slicers 44 and 45 are generated and provided to all of the filters, such signals being also fed from adjacent bins, that is their referent signals or the corresponding actual decisions. Note that although three F-BFs are shown in this particular embodiment, the invention can be implemented without one F-BF for edge sub-channels, with only one (middle) F-BF, or more than three F-BFs.

In the structure with one F-BF block, the dashed interpolator block 53 is active during a training interval, and side F-BFs drown by dashed lines are omitted. During actual data transmission, the F-BF block is fed by complex symbols produced by appropriately combining quasi-complex symbols after and in front of slicer blocks 46 and 47 for every T/2 instant, whereby the commutator 49 is replaced by a sumator (not shown in the FIG. 3B), and its output is directly fed, as indicated by the dashed line bypassing commutator block in FIG. 3B.

Next, LMS and RLS coefficients adaptation will be discussed. By denoting the F-FF and the three F-BFs' complex coefficients for the $k^{th}$ sub-channels DFE structure by $c_{k,n}$ and $d_{k-,l}$, $d_{k+,l}$, $d_{k,l}$, with n=0, 1, ..., $2L_e$ and l=0, 1, ..., $2L_d$, respectively, where $L_e$ and $L_d$ are the F-F and F-B FIR filters spans expressed in number of QAM signaling intervals T, and the ±signs in k indices denote F-BFs fed by decisions from the outputs of adjacent bins equalizers, the noisy data samples at the output of $k^{th}$ bin equalizer for even index m, with presumed non-staggered real (in-phase) components, are given by equation (4) below:

$$\hat{a}_{k,m} = \quad (4)$$

$$\sum_{n=0}^{2L_e-1} \left[c_{k,n}^R\left(\breve{X}_{k,m+L_e-n}^R + \xi_{k,m+L_e-n}^R\right) - c_{k,n}^{\mathfrak{J}}\left(\breve{X}_{k,m+L_e-n}^{\mathfrak{J}} + \xi_{k,m+L_e-n}^{\mathfrak{J}}\right)\right] -$$

$$\sum_{l=0}^{L_d-1} [d_{k,2l+1}^R \overline{a}_{k,m-2l-2} - d_{k,2l}^{\mathfrak{J}} \overline{a}_{k,m-2l-1}] +$$

$$\sum_{l=0}^{L_d-1} [d_{k-,2l}^R \overline{a}_{k-1,m-2l-1} - d_{k-,2l+1}^{\mathfrak{J}} \overline{a}_{k-1,m-2l-2}] +$$

$$\sum_{l=0}^{L_d-1} [d_{k+,2l}^R \overline{a}_{k+1,m-2l-1} - d_{k+,2l+1}^{\mathfrak{J}} \overline{a}_{k+1,m-2l-2}].$$

The noisy data samples for odd indexes m, that is presumed staggered quadrature components, has the same form as above, except for replacing the minus signs with plus signs in all four square brackets, and for swapping the real and imaginary parts ($\mathfrak{R}$ and $\mathfrak{J}$, respectively) of the noisy line signal samples in round brackets in the first sum of equation (4). In these expressions, the delay of about $L_e \cdot T/2$ sample intervals between the appearance of noisy sample at the referent (middle) tap of the F-FF, and the availability of the corresponding data symbols' decisions (over-bared data symbols) is taken into account.

The squared absolute value of decision error at the output of $k^{th}$ bin equalizer in [m/2]=$m'^{th}$ signaling interval T is given by equation (5) below:

$$E_{m'} = \frac{1}{2}\{(\hat{a}_{k,m} - \bar{a}_{k,m})^2 + (\hat{a}_{k,m+1} - \bar{a}_{k,m+1})^2\}. \quad (5)$$

As known to those skilled in the art, equalizer coefficients are generally estimated by some method of mean squared error minimization (MMSE). An ensemble minimization of the above quantity leads to various forms of the MMSE estimation of equalizer coefficients. The steepest gradient method based on an approximation of ensemble average of squared error by its instantaneous value given by equation (5) represent the simple stochastic gradient, or the commonly used Least Mean Square (LMS) algorithm. Following the generic expression for the steepest gradient algorithm given by equation (6) below:

$$\text{Coefficient } (m'+1) = \text{Coefficient } (m') - \beta \cdot (\nabla E_{m'} / \nabla_{Coeff}), \quad (6)$$

where the conveniently chosen step-size parameter $\beta$ scales down the derivation of instantaneous error with respect to the particular equalizer coefficient to update its value from the previous, $m'$-th interval one. By accounting statistical i.i.d. feature of sub-channel data sequences and their mutual independency, an application of the procedure implied by equation (6) leads to following expressions for adaptation of the coefficients' real and imaginary parts:

$$c_{k,n}^{R,m'+1} = c_{k,n}^{R,m'} - \quad (7)$$
$$\beta \cdot \begin{bmatrix} (\hat{a}_{k,m} - \bar{a}_{k,m}) \cdot (\tilde{x}_{k,m+L_e-n}^R + \xi_{k,m+L_e-n}^R) + \\ (\hat{a}_{k,m+1} - \bar{a}_{k,m+1}) \cdot (\tilde{x}_{k,m+1+L_e-n}^J + \xi_{k,m+1+L_e-n}^J) \end{bmatrix} c_{k,n}^{J,m'+1} =$$
$$c_{k,n}^{J,m'} - \beta \cdot \begin{bmatrix} (\hat{a}_{k,m+1} - \bar{a}_{k,m+1}) \cdot (\tilde{x}_{k,m+1+L_e-n}^R + \xi_{k,m+1+L_e-n}^R) - \\ (\hat{a}_{k,m} - \bar{a}_{k,m}) \cdot (\tilde{x}_{k,m+L_e-n}^J + \xi_{k,m+L_e-n}^J) \end{bmatrix};$$

$$d_{k,2l+1}^{R,m'+1} = d_{k,2l+1}^{R,m'} + \beta \cdot \begin{bmatrix} (\hat{a}_{k,m} - \bar{a}_{k,m}) \cdot \bar{a}_{k,m-(2l+1)-1} + \\ (\hat{a}_{k,m+1} - \bar{a}_{k,m+1}) \cdot \bar{a}_{k,m-(2l+1)} \end{bmatrix}; \quad (8)$$

$$d_{k,2l}^{J,m'+1} = d_{k,2l}^{J,m'} + \beta \cdot \begin{bmatrix} (\hat{a}_{k,m+1} - \bar{a}_{k,m+1}) \cdot \bar{a}_{k,m-2l} - \\ (\hat{a}_{k,m} - \bar{a}_{k,m}) \cdot \bar{a}_{k,m-(2l+1)} \end{bmatrix};$$

$$d_{k-,2l+1}^{J,m'+1} = d_{k-,2l+1}^{J,m'} + \beta \cdot \begin{bmatrix} (\hat{a}_{k,m+1} - \bar{a}_{k,m+1}) \cdot \bar{a}_{k-1,m-(2l+1)} - \\ (\hat{a}_{k,m} - \bar{a}_{k,m}) \cdot \bar{a}_{k-1,m-(2l+1)-1} \end{bmatrix}; \quad (9)$$

$$d_{k-,2l}^{R,m'+1} = d_{k-,2l}^{R,m'} + \beta \cdot \begin{bmatrix} (\hat{a}_{k,m} - \bar{a}_{k,m}) \cdot \bar{a}_{k-1,m-(2l+1)} + \\ (\hat{a}_{k,m+1} - \bar{a}_{k,m+1}) \cdot \bar{a}_{k-1,m-(2l+1)-1} \end{bmatrix};$$

$$d_{k+,2l+1}^{J,m'+1} = d_{k+,2l+1}^{J,m'} + \beta \cdot \begin{bmatrix} (\hat{a}_{k,m+1} - \bar{a}_{k,m+1}) \cdot \bar{a}_{k+1,m-(2l+1)} - \\ (\hat{a}_{k,m} - \bar{a}_{k,m}) \cdot \bar{a}_{k+1,m-(2l+1)-1} \end{bmatrix}; \quad (10)$$

$$d_{k+,2l}^{R,m'+1} = d_{k+,2l}^{R,m'} + \beta \cdot \begin{bmatrix} (\hat{a}_{k,m} - \bar{a}_{k,m}) \cdot \bar{a}_{k+1,m-(2l+1)} + \\ (\hat{a}_{k,m+1} - \bar{a}_{k,m+1}) \cdot \bar{a}_{k+1,m-(2l+1)-1} \end{bmatrix}.$$

The above equations (7-10) are equivalent with the equations for LMS complex equalizer coefficients adaptation performed two times per T interval with purely real and purely imaginary errors for the respective even and odd T/2 intervals. For example, an application of the complex LMS algorithm two times per T interval to adapt the F-FF coefficients results in $$\{c_{k,n}^{R,m'+1} + jc_{k,n}^{J,m'+1}\}' = \{c_{k,n}^{R,m'} + jc_{k,n}^{J,m'}\}' - \beta \cdot \{(\hat{a}_{k,m} - \bar{a}_{k,m}) \cdot \quad (11)$$
$$[(\tilde{x}_{k,m+L_e-n}^R + \xi_{k,m+L_e-n}^R) + j(\tilde{x}_{k,m+L_e-n}^J + \xi_{k,m+L_e-n}^J)]^*\}$$

$$\{c_{k,n}^{R,m'+1} + jc_{k,n}^{J,m'+1}\}'' = \{c_{k,n}^{R,m'} + jc_{k,n}^{J,m'}\}'' - \beta \cdot \{j(\hat{a}_{k,m+1} - \bar{a}_{k,m+1}) \cdot \quad (12)$$
$$[(\tilde{x}_{k,m+1+L_e-n}^R + \xi_{k,m+1+L_e-n}^R) + j(\tilde{x}_{k,m+1+L_e-n}^J + \xi_{k,m+1+L_e-n}^J)]^*\}$$

By factoring out the increments of real and imaginary parts of F-FF coefficients in these two equations, their respective sums turn out to be the same as in equations (7) and (8) above, implying the same number of real multiplications as in case of fractional T/2 spaced F-FF part with the same time span in conventional SC QAM format. The number of real multiplications in calculation of the F-FF outputs needed within one signaling interval is also same: $4L_e$. Similarly, in the case of the central F-BF, for example, the two subsequent adaptations for odd indexed coefficients in one interval T using purely real and purely imaginary errors leads to the following two equations:

$$\{d_{k,2l+1}^{\Re,m'+1} + jd_{k,2l+1}^{\Im,m'+1}\}' = \{d_{k,2l+1}^{\Re,m'} + jd_{k,2l+1}^{\Im,m'}\} + \beta \cdot \{(\hat{a}_{k,m} - \bar{a}_{k,m}) \cdot [(\bar{a}_{k,m-(2l+1)-1}) + j(0)]^*\}; \quad (13)$$

$$\{d_{k,2l+1}^{\Re,m'+1} + jd_{k,2l+1}^{\Im,m'+1}\}'' = \{d_{k,2l+1}^{\Re,m'} + jd_{k,2l+1}^{\Im,m'}\} + \beta \cdot \{j(\hat{a}_{k,m+1} - \bar{a}_{k,m+1}) \cdot [(0) + j(\bar{a}_{k,m-(2l+1)})]^*\}. \quad (14)$$

Since the symbol decisions fed to the F-BF at T/2 instants are also purely real or purely imaginary, the increment to imaginary parts of odd F-BF coefficients are zero, while the summed increments to the real part correspond to that of equation (9) above. Since for every T interval adaptation that has to be performed on both odd and even indexed coefficients, the number of operation is same as for the conventional QAM SC system of the same FBF time span. The same applies to the number of multiplications needed to calculate the output of the FBF during one T interval: $4L_d$. This type of adaptation is appropriate for the adaptation of DFE structure without reliance on interpolated symbols during training.

As is well known to those skilled in the art, yet another practical group of coefficient adaptation methods, which feature a much higher adaptation rate that the LMS algorithm, relies on time-domain averaging of squared errors and an adequate counterpart of steepest gradient method. The most common recursive least square (RLS) algorithm for each iteration adaptively calculates, in an optimized fashion, the term which in the LMS algorithm corresponds to the product of the step-size $\beta$ and the complex conjugate of the signal/data sample fed to the particular coefficient. This adaptation method is directly applicable to DFE training based on interpolation.

The LMS and RLS adaptation methods with the FIR F-FF and F-BF structures are easily extendable through the use of lattice type structures, which is well known to those skilled in the art.

Figure 3B:
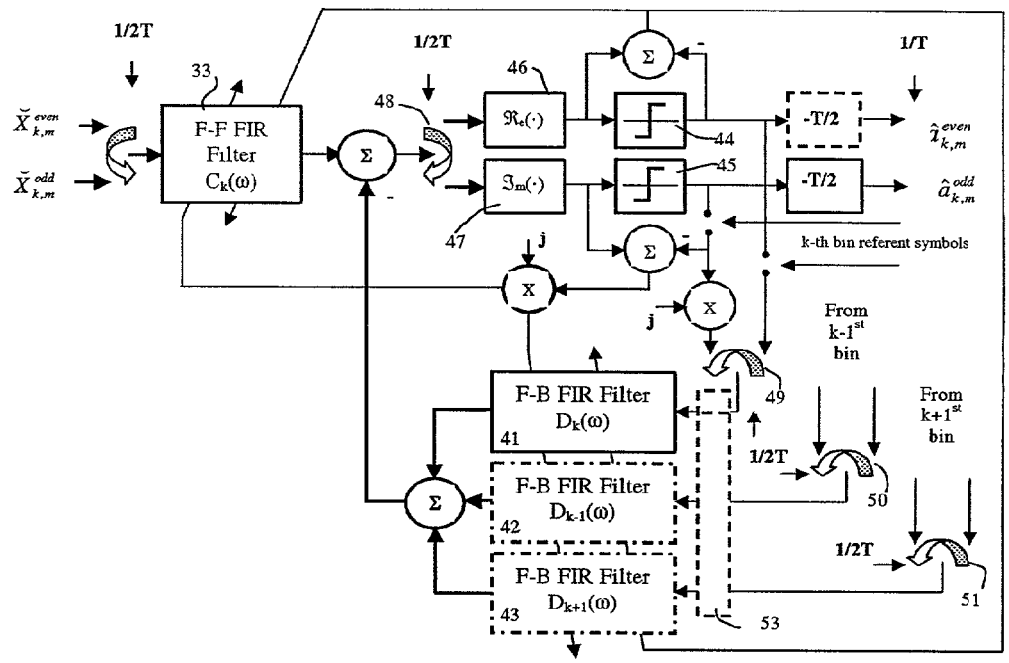
Figure 4:
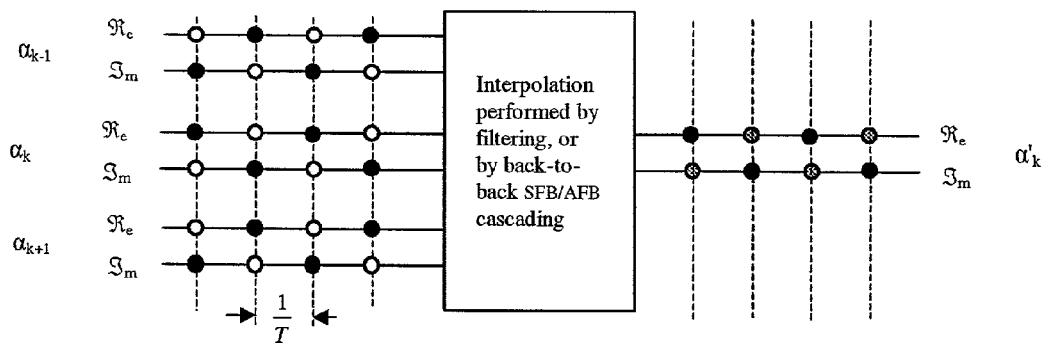
FIG. 4 is an Illustration of an interpolation procedure.

It is the application of RLS algorithm that dictates utilization of fully complex referent or decision-directed data symbols to be passed over to the F-BFs' inputs, as indicated in FIG. 3B by the optional presence of the interpolator 53. This in turn results in considerably improved performance as is illustrated below. The corresponding embodiment can be referred the one in FIG. 3B by incorporation of back-to-back cascaded configuration of FIG. 2B with N=4 at the input of groups of three F-FFs, or by other less complex interpolation arrangements. The operation of the interpolator block is illustrated in FIG. 4, which shows how the quasi-complex symbols are converted into complex ones by taking into account the inter-symbol and adjacent inter-bin cross-talk, while keeping the information bearing components largely intact. As noted earlier, only one F-BF is generally needed.

In a decision-directed mode, that is during actual data transmission, the receiver-end interpolation is implicitly included into the equalizer filtering operation, therefore there is not a causality problem, and only stability might be an issue. With decisions done only on information bearing (non-interpolated) quadrature components, this problem is largely alleviated, although in some situations care should be taken to assure essentially minimal phase transfer function conditions by appropriately defining symbol timing, or by other means. On the other hand, to alleviate the problem of extensive error propagation pertinent to the referent DFE configuration, and also to possibly move the larger part of implementation complexity burden to the base-station transmitter in down-link transmission, another embodiment can be used.

Figure 5A:
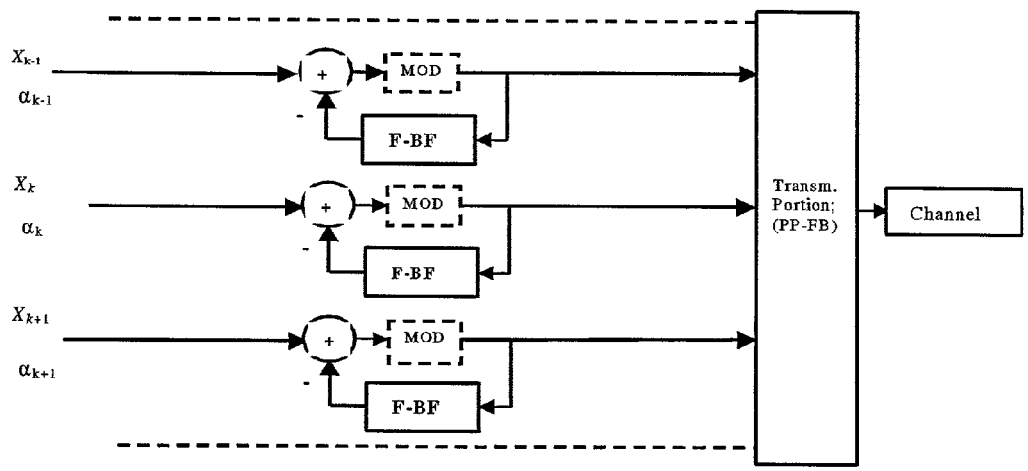
FIGS. 5A and 5B are diagrams of an embodiment of the present invention with pre-coding. The transmitter part is in FIG. 5A and the receiver part is in FIG. 5B.
Figure 5B:
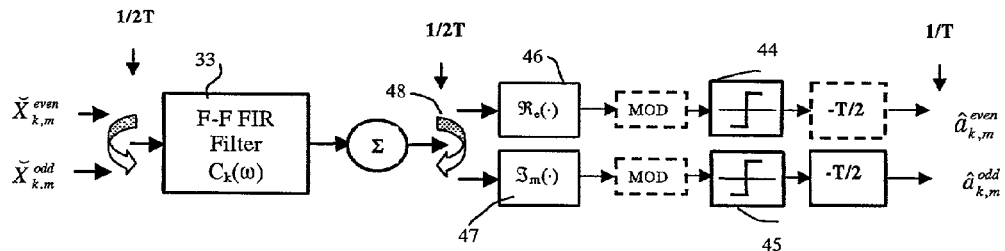

This other embodiment is shown in FIGS. 5A and 5B. FIG. 5A shows the transmitter part and FIG. 5B shows the receiver part. This embodiment applies to cases with interpolation, and makes use of one per sub-channel F-B filters in the pre-equalization, that is pre-coding configuration at the transmitter side, by "moving" the one F-BF from receiver to transmitter side after initial adaptation, so that only an FFF remains in the receiver part. The initially adapted coefficients are transferred from the receiver part to the transmitter part by appropriate means, before switching to data transmission mode in frequency-division duplexing (FDD) arrangements, or are tentatively estimated in time-division duplexing (TDD) scenarios. Note that only the non-interpolated quasi-complex data samples are passed over to the pre-coder inputs, although the equalizer coefficients were adapted by feeding interpolated data symbols into FB-Fs. In line with the conventional single-carrier pre-coding (see M. Tomlinson, "New automatic equalizer employing modulo arithmetic," Electronics Letters, Vol. 7, pp. 138-139, March 1971, 1986) the modulo 2M operation, where M is the maximal nominal data symbol level, applied to information bearing quadrature components only, helps keep only a modest transmit power increase that results from the pre-coding operations in the feed-back loops. Because of a possible instability problem caused by the inability of a regular modulo operation on interpolated values of precoder outputs, appropriate means should be used to control symbol timing to ensure desirable channel conditions, or by only occasionally performing a modulo operation despite the likely appearance of short error sequences.

Figure 6:
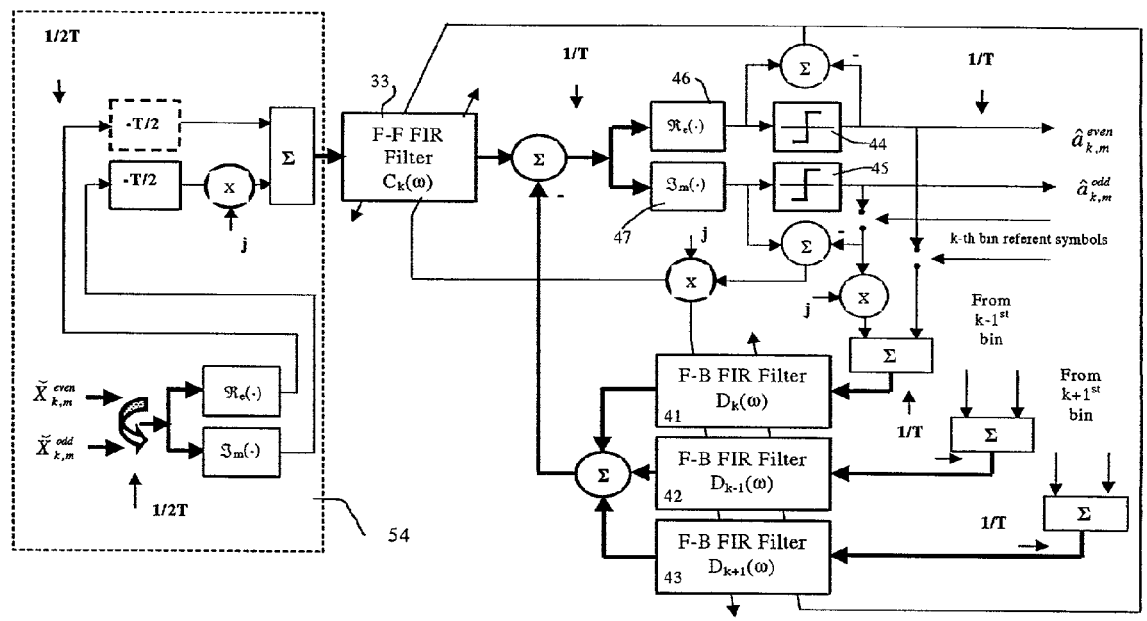
FIG. 6 is an illustration of DFE combined with Hirosaki's linear equalization, designated here as DFE-H.

Yet another embodiment is shown in FIG. 6. This embodiment is related to combining the up to three F-B filters with a linear equalizer 54 (see Hirosaki, U.S. Pat. No. 4,621,355) wherein the re-alignment of the in-phase and quadrature components of the T/2 space receiver filter-bank outputs is done in front of the F-F filter. Consequently, the F-B filters are fed by complex data symbols and coefficient adaptation is performed using complex error samples once per T. Since the F-B FIR filters have a regular, analytic structure (even with one F-BF in the case with symbol interpolation) this filtering could apparently not be moved to the transmitter side, because of essential non-equivalency of commutation (exchanging order) of non-matched filtering structures, since the Hirosaki's F-FF and the corresponding equivalent channel transfer function for particular bin are essentially non-analytic.

Figure 7A:
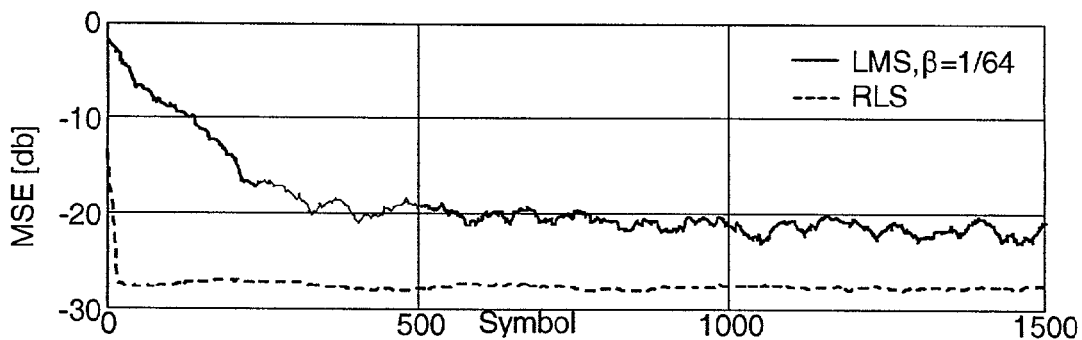
FIGS. 7A through 7D are illustrations of per-bin DFE equalizer convergence, filter coefficients, and Feed-Forward Filter (F-FF) spectral characteristics.

Finally, simulation results will be discussed. Illustration of LMS and RLS equalizer convergence, examples of feed-forward equalizer transfer functions F-F and F-B filter and coefficients are shown in FIGS. 7A through 7D. Filter-bank transform with N=128, four T intervals ($L_p$=4) long prototype impulse response (see for example, A. Valin and N. Holte, "Optimal Finite Duration Pulses for OFDM," *IEEE Tr. on Com.*, Vol. 44, No. 1, pp. 10-14, Jan. '96), and particular F-F and F-B equalizer FIR filter spans $L_eT$ and $L_dT$ are considered. The situation corresponds to x-th bin and a particular realization of frequency selective fading three paths power delay profile $1+1 \cdot z^{-200}+0.1 \cdot z^{-400}$, in the presence of r absence of NBI tone signal located in the meddle between 16-th and 17-th bins. DFE equalizer convergence for LMS and RLS adaptation algorithms is illustrated in FIG. 7A. The LMS convergence is very slow, because of large disparity between eigenvalues of the equalizer input signal correlation matrix. Since the RLS algorithm converges very rapidly, it becomes a practical means for coefficient initialization for packetized transmission, and subsequent switching to LMS algorithm to track slow changes in linear distortions. Note that interpolated referent symbols, needed for OQAM/TLO case, can be memorized or generated "off-line", without much increase in complexity. For LMS adaptation, only real or imaginary part of error signal is used at every T/2 intervals.

Figure 7B:
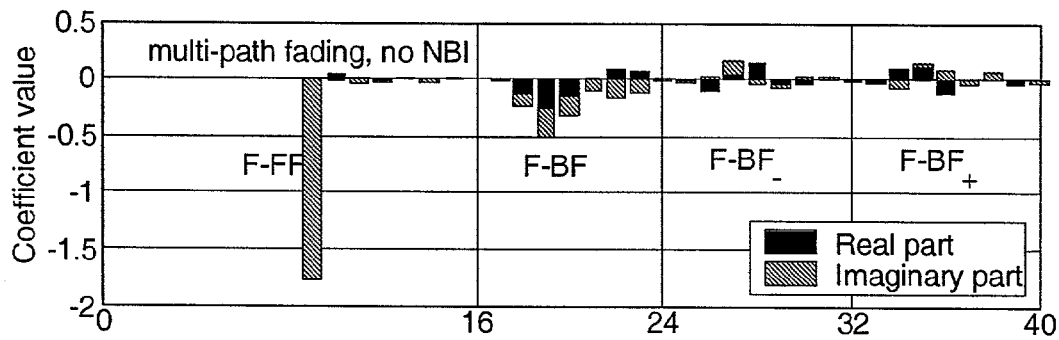
Figure 7C:
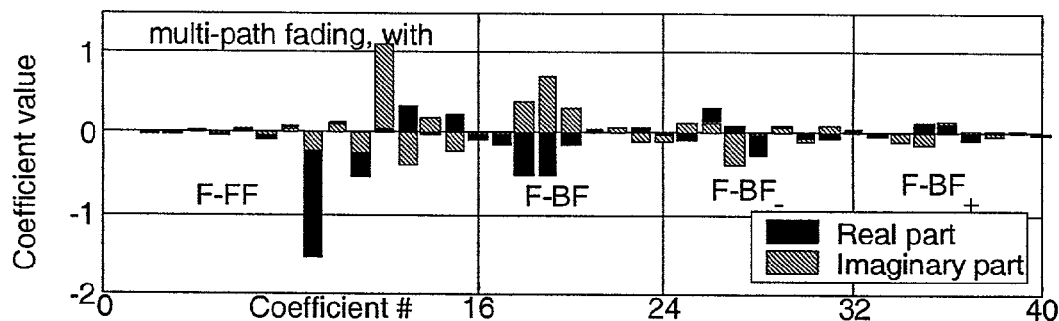
Figure 7D:
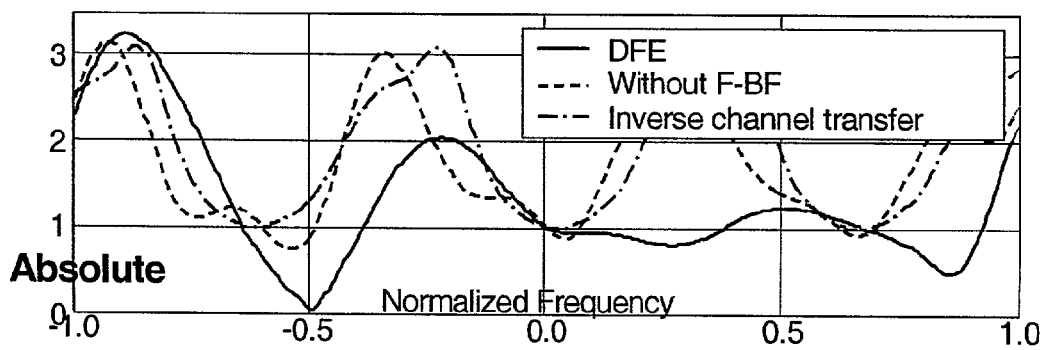

Corresponding F-F and F-B filter coefficients are shown in FIG. 7B. An illustration of DFE intrinsic feature to compromise inversion of the transmission channel transfer function and the narrow-band interference (NBI) suppression is shown in FIG. 7C. The equivalent inverse channel transfer functions for the nominal sub-channel bandwidth are also shown for the sake of comparison. It can be seen that the feed-forward (F-F) filter transfer function attempts to substantially synthesize the targeted inverse of the equivalent LP channel transfer function, and that in DFE configuration it is largely unrelated to it, but rather attempts to optimally compromise the matched filtering and the NBI suppressing tasks. Notice that in the absence of NBI, the F-F coefficients other than the referent one are relatively small and might be neglected.

Figure 8:
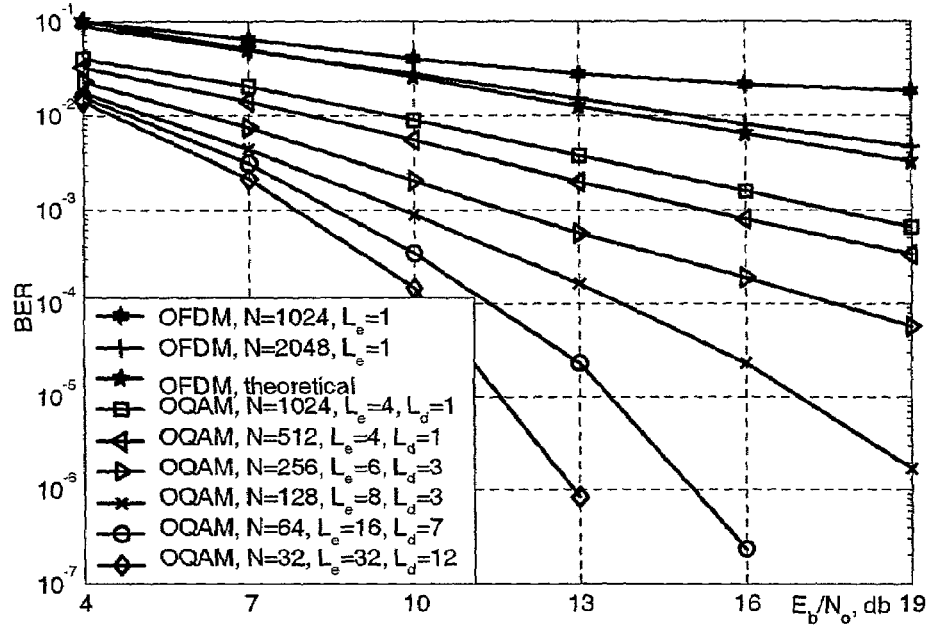
FIG. 8 is an illustration of bit error probability as function of signal to noise ratio (SNR) for OFDM and OQAM-MC with variable number of sub-channels, accommodated within same channel bandwidth.

Dependence of bit error probability on SNR values for conventional OFDM system (with N=1024 and 2048, and CP=0.25N), and for OQAM-MC systems with varying parameter N are shown in FIG. 8, as averaged over fading realizations of the delay profile $1+0.75 \cdot z^{-5}+0.75 \cdot z^{-10}+0.75 \cdot z^{-30}+0.5 \cdot z^{-90}+0.5 \cdot z^{-120}+0.25 \cdot z^{-150}+0.25 \cdot z^{-155}+0.25 \cdot z^{-160}+1 \cdot z^{-180}+0.75 \cdot z^{-240}+0.5 \cdot z^{-270}+0.5 \cdot z^{-300}+0.5 \cdot z^{-305}+0.5 \cdot z^{-310}+0.25 \cdot z^{-330}+0.1 \cdot z^{-390}$. In all the cases, the 4-level QAM was assumed and OFDM data rate is for 20% lower than in OQAM-MC case, because of CP utilization. While the OFDM error rate decreases linearly with SNR in dB, it can be seen that OQAM-MC cases have an error probability behavior similar to QAM systems with explicit diversity. With the widening of sub-channel bandwidths accompanied by an increase of F-F anf F-BF lengths, the BER curves increasingly take a water-fall shape. For the $10^{-3}$ error probability about 16 dB more power is needed for the 2048-OFDM case than in case of 128-OQAM-MC. The effectiveness of intermediate and lower number of sub-channels appears even more pronounced for lower targeted BER, as $10^{-6}$ for data and video communications, where the SNR difference amounts to even 48 dB, as is revealed by comparison between 32-OQAM-MC and 2048-OFDM cases. To achieve this low $P_b$ level for comparable SNR, a FEC over-head is needed in OFDM case, implying both a proportionate decrease in basic data rate, and an increased decoding complexity.

Figure 9:
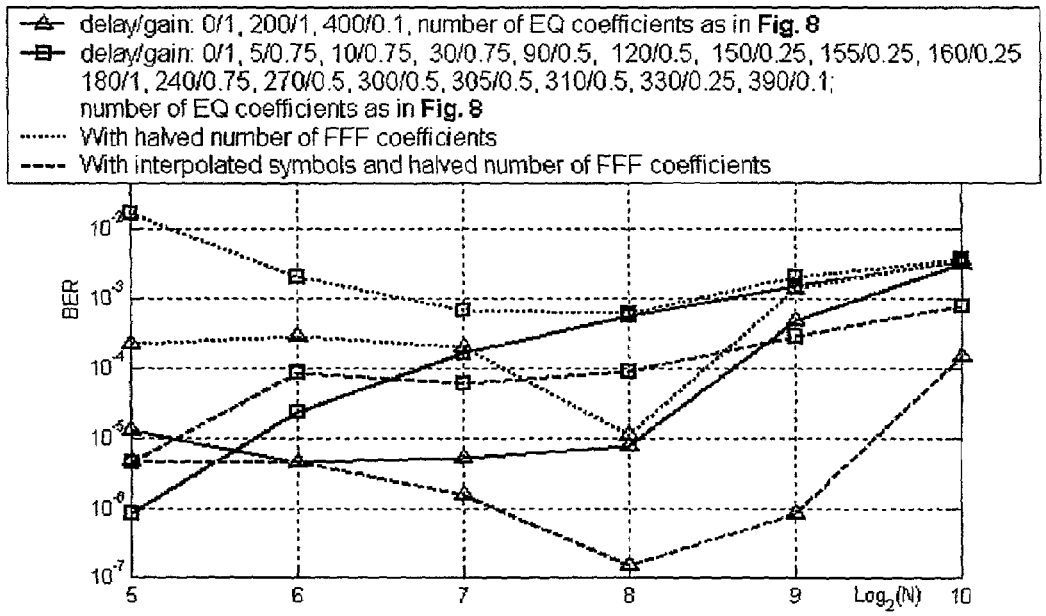
FIG. 9 is an illustration of bit error rate for various multi-path profiles and SNR of 10 dB as function of number of sub-channels, accommodated within same channel bandwidth.

In FIG. 9, bit error rates are shown as function of N for two multi-path profiles, with the same time span. One pair of curves (full line) retain the same number of equalizer coefficients as indicated in the legend of FIG. 8, and for dotted lines the F-FF time span is halved. It can be seen that for OQAM-MC case, the optimal N shifts consistently toward lower values with an increased richness of multi-path delay profile. Feeding the F-B filters with interpolated samples to complement the pertinent QAM symbols' quasi-complex decompositions still further increase the transmission performance, as shown in FIG. 6 by the dashed lines. Although the number of F-FF coefficients remains halved, a substantial BER reduction is achieved also for relatively high number of sub-channels.

According to Evangelista (above), the number of real multiplications per line sampling interval for the OQAM-MC system amounts to $4 \cdot L_p + \log_2(N/2)$, compared with $2 \cdot \log_2(N)$ for OFDM case. Since OQAM-MC system is targeted at utilization of an intermediate number of sub-channels, a comparison for the cases N=64 and N=1024 reveals 21 and 20 for OQAM-MC and OFDM, respectively. If double shorter referent impulse is used, $L_p=2$ for example (practically no performance degradation was noticeable for BERs higher then $10^{-3}$.), then for the same number of operations, besides demodulator one tap FFF and FBF can be implemented in OQAM-MC system. Additional complexity required for sufficiently long adaptive filters (in packetized transmission the length of adaptive structures can be redistributed among sub-channels, depending on SNR—e.g., lattice filters based structures, see for example, R. D. Gitlin, J. F. Hayes and S. B. Weinstein, "Data Communication Principles," 1992 Plenum Press, New York, p. 564), or for symbol interpolation, actually buys the improved performance. One should notice that the required FEC overhead in OFDM for same performance levels will apparently be much higher, so that OQAM-MC can give higher data rate with similar complexity.

This invention describes a non-linear equalization as applicable to sub-channels of OQAM-based multi-carrier formats and indicated the potential for their utilization for advanced wireless systems as an alternative to OFDM. Since the DWMT systems fall into same category, per-bin DFE is also applicable here as an alternative to linear equalization (see for example, J. Alhava, M. Renfors, "Adaptive sine-modulated/cosine-modulated filter bank equalizer for transmultiplexers," *ECCTD'*01, August 28-31, Espoo, Finland, 2001), which, based of the equivalence described on page 4, line 11 through page 5, line 21 above appears just as a reworking of linear per-bin equalization that served as a starting point in development and embodying of this invention.

While this invention has been described in its preferred form, it will be appreciated that changes may be made in the form, construction, procedure and arrangement of its various elements and steps without departing from its spirit or scope.

What is claimed is:

1. A multi-carrier data transmission receiver comprising:
a subchannel demodulator arranged to demodulate one of a plurality of subchannels in a multi-carrier modulated data transmission system;
a subchannel equalizer coupled to the subchannel demodulator and comprising a cascade of a feed-forward finite impulse response (FIR) filter with a feed-back finite impulse response (FIR) filter, the feed-back FIR filter receiving and processing a currently decided symbol in the subchannel;
a second subchannel demodulator arranged to demodulate a second one of the plurality of subchannels in a multi-carrier modulated data transmission system;
a second subchannel equalizer coupled to the second subchannel demodulator and comprising a cascade of a feed-forward finite impulse response (FIR) filter with a feed-back finite impulse response (FIR) filter, the feed-back FIR filter receiving and processing a currently decided symbol in the subchannel;
at least two pulse amplitude modulation (PAM) slicers;
a real extractor; and
an imaginary extractor;
wherein the real and imaginary extractors receive data from the feed-forward finite impulse response (FIR) filter and output data to the PAM slicers; and
wherein data from the PAM slicers is provided to the feed-back finite impulse response (FIR) filter.

2. A multi-carrier data transmission receiver comprising:
a plurality of subchannel demodulators, each arranged to demodulate one of a plurality of subchannels in a multi-carrier modulated data transmission system;
a plurality of subchannel equalizers, each coupled to a corresponding subchannel demodulator, and each comprising a cascade of a feed-forward finite impulse response (FIR) filter with at least one feed-back finite impulse response (FIR) filter, the feed-back FIR filter receiving and processing a currently decided symbol in the subchannel;
at least two pulse amplitude modulation (PAM) slicers;
a real extractor; and
an imaginary extractor;
wherein the real and imaginary extractors receive data from the feed-forward finite impulse response (FIR) filter and output data to the PAM slicers; and
wherein data from the PAM slicers is provided to the at least one feed-back finite impulse response (FIR) filter.

3. The multi-carrier transmission receiver of claim 1 wherein at least one of the subchannel equalizers further comprises at least one additional feed-back finite impulse response (FIR) filter arranged to receive and process currently decided symbols from another one of the plurality of subchannels.

4. The multi-carrier transmission receiver of claim 1 wherein at least one of the subchannel equalizers further comprises an interpolator which interpolates the currently decided symbol before the feed-back FIR filter processes the currently decided symbol.

5. The multi-carrier transmission receiver of claim 1 wherein coefficients of the feed-forward finite impulse response (FIR) filter and the feed-back finite impulse response (FIR) filter are adapted using one of a recursive least square (RLS) and least mean square (LMS) method.

6. The multi-carrier transmission receiver of claim 1 wherein the feed-forward finite impulse response (FIR) filter has a per-subchannel dual automatic equalizer structure.

7. The multi-carrier transmission receiver of claim 2 wherein the subchannel equalizers further comprise at least one additional feed-back finite impulse response (FIR) filter, the additional feed-back FIR filter arranged to receive and process currently decided symbols from another one of said plurality of subchannels.

8. The multi-carrier transmission receiver of claim 2 wherein the feed-forward finite impulse response (FIR) filters have a per-subchannel dual automatic equalizer structure.

9. The multi-carrier transmission receiver claimed in one of claims 1 or 2 wherein the multi-carrier modulated data transmission system has spectrally shaped and overlapped sub-channels.

10. The multi-carrier transmission receiver claimed in one of claims 1 or 2 wherein the multi-carrier modulated data transmission system is an orthogonal quadrature amplitude modulation (OQAM)-based system.

11. A multi-carrier transmission receiver comprising:

a subchannel demodulator arranged to demodulate one of a plurality of subchannels in a multi-carrier modulated data transmission system;

a subchannel equalizer coupled to the subchannel demodulator and comprising a cascade of a feed-forward finite impulse response (FIR) filter with a feed-back finite impulse response (FIR) filter, the feed-back FIR filter receiving and processing a currently decided symbol in the subchannel;

at least two pulse amplitude modulation (PAM) slicers;

a real extractor; and an imaginary extractor;

wherein the real and imaginary extractors receive data from the feed-forward finite impulse response (FIR) filter and output data to the PAM slicers; and wherein data from the PAM slicers is provided to the feed-back finite impulse response (FIR) filter.

* * * * *